July 15, 1952 P. L. SNYDER ET AL 2,603,442
APPARATUS FOR WEIGHING AND BAGGING MATERIALS
Filed April 20, 1948 3 Sheets-Sheet 1

PAUL L. SNYDER,
CECIL MILLER,
INVENTORS

BY *Robert N. Fulwider*
ATTORNEY.

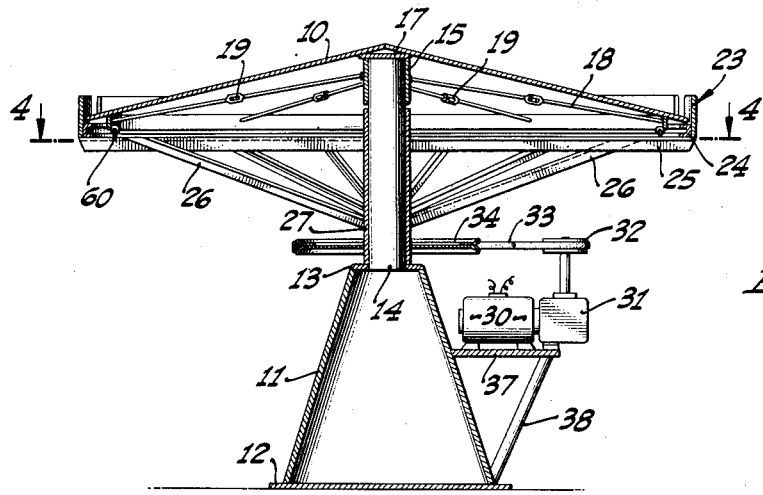
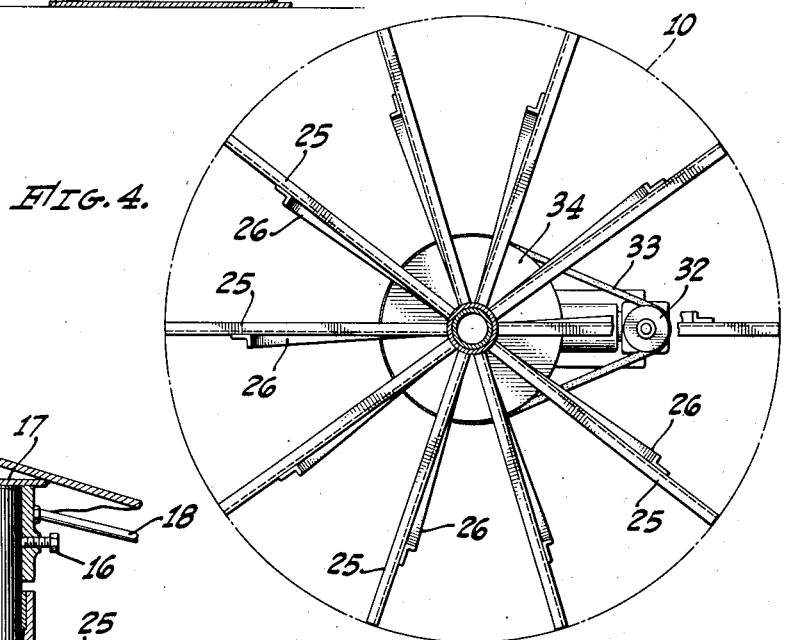
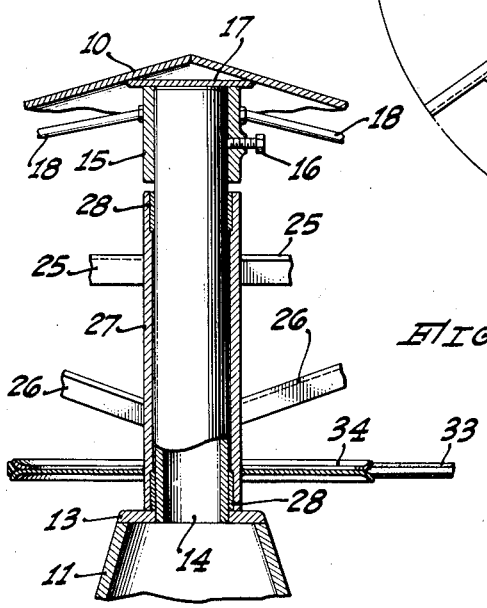
Paul L. Snyder,
Cecil Miller,
Inventors

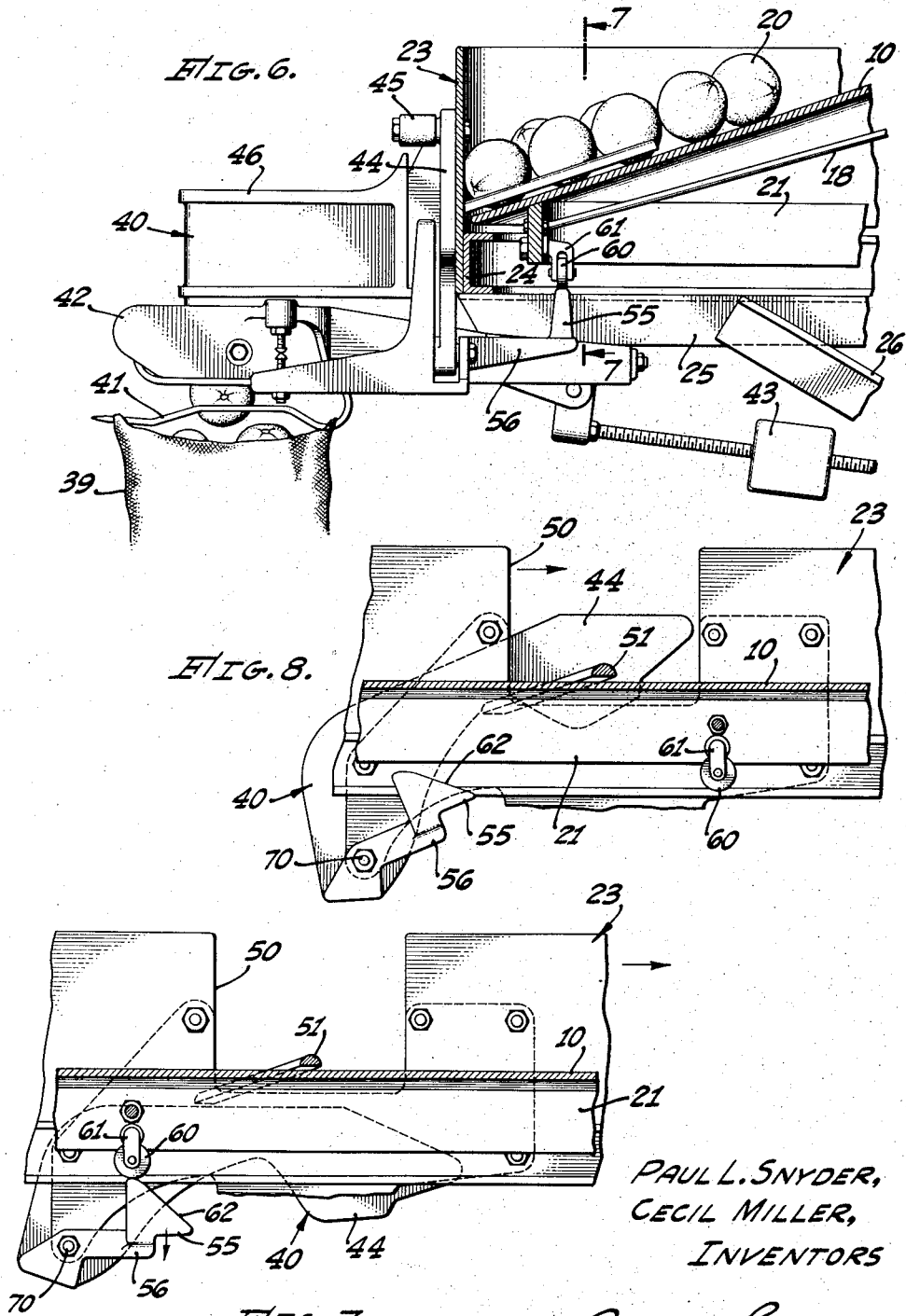

Patented July 15, 1952

2,603,442

UNITED STATES PATENT OFFICE 2,603,442

APPARATUS FOR WEIGHING AND BAGGING MATERIALS

Paul L. Snyder and Cecil Miller, Pomona, Calif.

Application April 20, 1948, Serial No. 22,186

3 Claims. (Cl. 249—58)

The present invention relates generally to apparatus for packaging fruits, vegetables, and other products, and more particularly to a device of this class which conveys materials into a bag and automatically terminates the flow of material thereinto when a predetermined weight is reached.

It is conventional practice in the packaging of food products and similar materials to provide a number of weighing stations along a continuously moving conveyor system and provide at each of such weighing stations an automatic weighing machine which terminates the flow of material from the conveyor into a bag or other package when a predetermined weight of such material has been delivered into the package. Such apparatus is often provided with a signal light or flag at each of said weighing stations so that a single operator may operate several weighing stations, removing the filled packages, replacing an empty package in the weighing station, and reinstituting the flow of material thereinto.

Such an operation has the disadvantage, however, that the operator must move from one station to another and furthermore, since the filled packages are picked up from various separated points, a parallel conveying system must usually be provided to transport the filled packages as they are removed from the weighing stations.

Another disadvantage of the conventional arrangement just described is that it is not economical of floor space but requires a considerable extent of conveyor system leading to the weighing stations, and another extended system to carry away the filled packages.

Still another disadvantage of the conventional system is that if the operator forgets to reinstitute the delivery of material into a replaced empty container, that particular weighing station becomes inoperative until the operator remembers to take care of the oversight.

Bearing in mind the foregoing disadvantages of conventional apparatus, it is one object of our invention to provide apparatus, for the purpose described which may be operated from a single operating station and in which the filled bags are carried to the operator who may remove them from a single point rather than having to move from one station to the other.

It is another object of our invention to provide apparatus of the class described in which the flow of material into a package is reinstituted automatically after the removal of a filled package.

It is a further object of our invention to provide apparatus of the class described which is economical of floor space and requires a minimum of mechanical power to operate.

It is still another object of our invention to provide packaging apparatus adapted for use with fruit and vegetables, wherein the conveying of unpackaged products is reduced to a minimum, thereby avoiding the damage which may be occasioned by transporting the unpackaged product over long distances through conventional conveyor systems.

The foregoing objects and advantages of the invention will become apparent from the following detailed description, considered in connection with the attached drawings, in which:

Figure 3 is an elevational section taken on the line 3—3 in Figure 1;

Figure 4 is a horizontal section taken on the line 4—4 in Figure 3;

Figure 5 is a fragmentary, enlarged portion of Figure 3, showing details of the construction therein;

Figure 6 is an enlarged elevational section taken on the line 6—6 in Figure 1, illustrating one of the weighing units employed in connection with our invention;

Figure 7 is an elevational section taken on the line 7—7 in Figure 6; and

Figure 8 is an elevational section similar to Figure 7 but illustrating certain parts in an operated position.

Our invention is illustrated herein as embodied in a machine for automatically bagging oranges. It will be realized, of course, that with little or no modification, the same apparatus can be used for bagging other products such as grains, vegetables, and the like.

Figure 1:
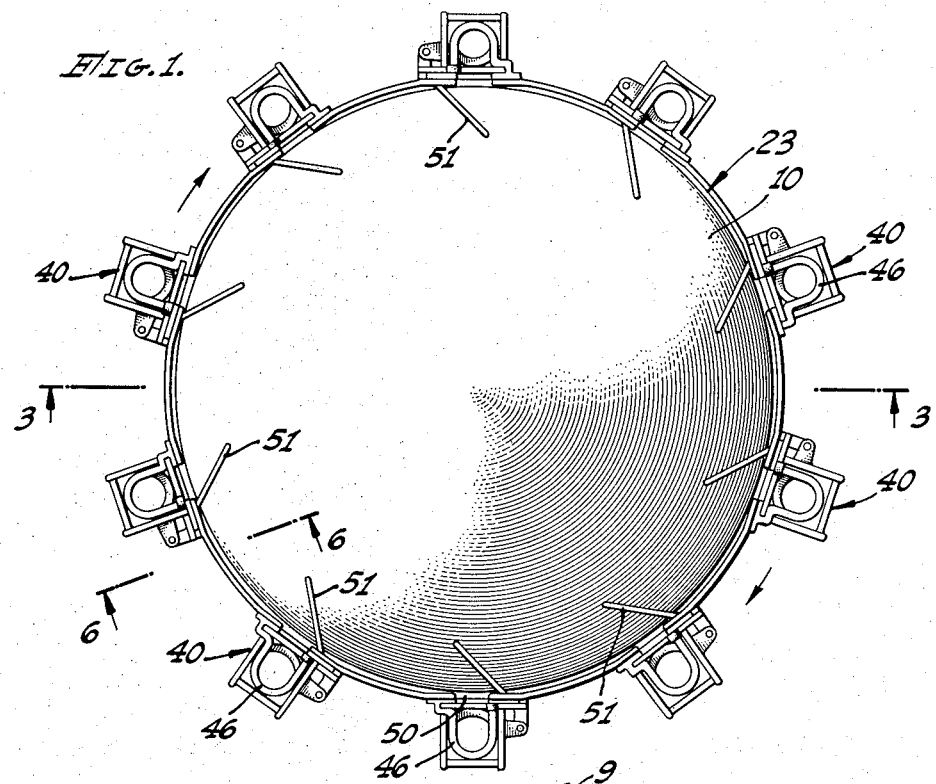
Figure 1 is a top plan view of a fruit bagging machine embodying our invention.
Figure 2:
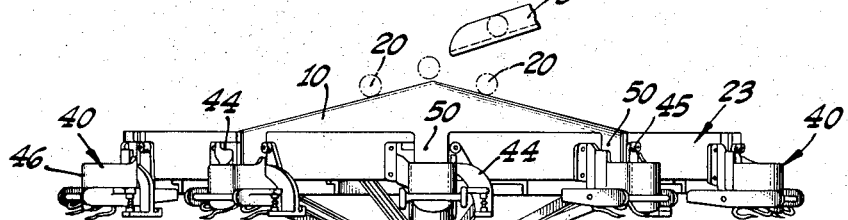
Figure 2 is a side elevational view of the apparatus illustrated in Figure 1.

Referring now to the drawings and particularly to Figures 1 and 2 thereof, it will be seen that oranges 20 are delivered from an inclined chute 9 at the apex of a stationary table having a flattened conical top 10. From the apex of the table top 10 the oranges roll downwardly in all directions toward the rim of the table as indicated in Figure 2. The apparatus described herein is supported generally on a relatively steep, conical standard 11 which is provided with a base flange 12 and a top flange 13, the latter flange having an upwardly extending tubular axle 14 welded thereto.

The table 10 is fixedly supported at the top of the tubular axle 14 by a collar 15 secured to the axle by a set screw or bolt 16 and having a small disc welded thereto which disc is in turn welded to the interior apex of the table top 10. As can be seen best in Figure 3, a number of spoke-like tie rods 18 are connected between the table-supporting collar 15 and a circular reinforcing band welded to the top 10 adjacent the outer rim thereof. Turnbuckles 19 are provided in the tie rods 18 whereby the various rods may be adjusted to uniform tension in order to pull the table 10 into a symmetrical conical shape.

Concentrically and rotatably mounted adjacent the outer edge of the table top 10 is a rotating rim or frame 23 which is suitably reinforced by a circular channel 24 as can be seen best in Figure 6 which rim carries a number of weighing units 40 to be described in more detail hereinafter. The rotating frame 23 is supported for rotation with respect to the table top 10 by a number of horizontal spokes 25 of angular cross-section braced by a number of diagonal spoke-like members 26 also of angular cross-section. The outer ends of the spokes 25 are welded to the reinforcing channel 24 as can be seen in Figure 6 and the inner ends are welded to a bearing tube 27 as is best shown in Figure 5. The inner ends of the brace members 26 are also welded to the bearing tube 27.

A pair of journal bearings 28 are mounted inside the ends of the bearing tube 27 whereby the entire rim assembly carrying the weighing units 40 may rotate freely on the tubular axle 14.

In order to drive the rotating rim assembly, we have provided an electric motor 30 supported on a horizontal base 37 welded to the conical standard 11 and suitably braced by a diagonal member 38. The drive motor 30 delivers rotary power through a speed reduction unit 31, a drive pulley 32, a V-belt 33, and a driven pulley 34 to the bearing tube 27. The driven pulley 34 is provided with spokes, the inner ends of which are welded to the bearing tube 27. The motor 30 is supplied with electrical power through a suitably controlled circuit (not shown) and drives the table in a clockwise direction as shown in Figure 1.

The weighing unit 40 is of the type disclosed in the copending application of Cecil Miller, Serial No. 787,927, filed November 25, 1947, and entitled Bagging Apparatus, the details of construction thereof being described herein only insofar as they pertain to the present invention.

The weighing unit 40 is adapted to suspend a mesh bag 39 on a pair of bag hooks 41 from the outer end of a scale beam 42, the mouth of the bag 39 being disposed beneath a guide 46 so that oranges delivered through the guide 46 fall into the bag 39. A gate 44 is provided and mechanically linked to the scale beam 42 so that when a predetermined weight of oranges has been delivered into the bag 39 this weight causes the beam to tilt downwardly (to the left in Figure 6) against the resistance of a latch mechanism held closed by a counter-weight 43, the tipping of the scale beam being effective to release the latch mechanism and raise the gate 44 and terminate the flow of oranges into the bag 39. When a bag has been filled to predetermined weight as just stated, it may then be removed from the bag hooks 41, a new and empty bag replaced thereon, and the scale beam lifted to open the gate 44 and reinstitute the flow of oranges into the empty bag.

The operation of the mechanism to close the gate takes place with a "snap" action suddenly raising the gate 44 into the position shown generally in Figure 8. By reason of this rapid action, a resilient bumper 45 of rubber or similar material is provided in the framework of the weighing unit so as to prevent damage to the mechanism due to the shock of its flow-terminating operation.

As can be seen best in Figures 2, 7 and 8, a U-shaped opening 50 is provided in the rotating rim 23 adjacent each of the weighing units 40. Thus the oranges 20 which roll down the table top 10 as previously described will roll outwardly through the rim 23 through such of the openings 50 as are open by virtue of the gate 44 being lowered therein. To expedite the outward motion of the oranges 20 through the openings 50, a finger 51 of semi-circular cross-section is welded to the inside of the rim 23 adjacent each of the openings 50 and extends inwardly at an angle as shown best in Figure 1. Thus as the outer rim 23 rotates clockwise as previously stated, the fingers 51 move around the table 10 and agitate the oranges 20 forcing them outwardly through the openings 50.

The oranges 20 rolling outwardly through the opening 50 fall into an empty bag as previously stated until a predetermined weight of oranges has been received in the bag, at which point the mechanism of the weighing unit 40 operates to close the gate 44 by raising the same. It will be realized that this filling operation takes place as the bags move around the table in a clockwise direction. Thus an operator standing at one point adjacent the periphery of the apparatus may remove the filled bags and replace empty bags on the units as they pass the unloading station, moving from right to left.

As previously stated, one of the objects of the present invention is to eliminate unnecessary activity on the part of the operator. To this end, it is desirable to eliminate the operation of resetting the weighing units 40 after a full bag has been removed therefrom and an empty bag replaced thereon. In order to so reset the weighing units, each of them is provided with a cam member 55 integrally connected to the gate 44 by an L-shaped bracket 56, the cam member 55 being positioned somewhat to the rear of the weighing unit 40 under the edge of the stationary table 10.

An operating roller 60 is supported in a bearing bracket 61 which in turn is bolted at a suitable point to the reinforcing band 21 of the stationary table 10. The cam operating roller 60 is so positioned as to engage the inclined surface 62 of the cam member 55 as the cam moves past the roller. As each weighing unit 40 moves past the roller 60, the latter engages the cam 55 causing the same to be moved downwardly thus rotating the gate 44 about its pivotal support 70 and opening the same. The opening motion of the gate 44 operates through the aforementioned linkage to reset the scale beam 42 in preparation for weighing the next bag of oranges. The scale beam is held in "set" position by the gravity urged latch mechanism as described in the above-mentioned copending application.

Thus as the weighing units 40 move around the table 10 they will be automatically reset as they pass a certain point at which is located the fixed cam operating roller 60. The cam operating roller 60 will therefore be properly located at a point slightly to the left of the operator, so that as the weighing units pass from right to left past the operator and an empty bag is replaced thereon, the weighing unit will, immediately thereafter, be operated to reinstitute the flow of oranges 20 into the bag 39.

The cycle of operation just described presupposes that the flow of oranges 20 from the chute 9 is at such rate that any particular bag 39 is filled in approximately the time necessary to make one complete circuit around the table 10. It will be realized, however, that with a greater rate of delivery of oranges 20, the bags 39 will be filled in a much shorter time than is required to make a complete circuit of the table 10. In such instances, several operators may stand at different points around the table 10, each unloading the filled bags that were loaded by the previous operator.

While the apparatus shown and described herein is fully capable of achieving the objects and providing the advantages hereinbefore stated, it will be realized that considerable modification can be made by those skilled in the art without departing from the spirit of the invention. For that reason, we do not mean to be limited to the forms shown and described, but rather to the scope of the appended claims.

We claim:

1. In apparatus of the class described: a supporting frame which includes a cylindrical rim mounted and adapted for rotation about a vertical axis, said cylindrical rim having a radial opening therethrough and an inwardly projecting agitator member carried by said rim adjacent said opening, a weighing machine supported on the outer periphery of said rim adjacent said opening whereby to receive material therethrough, said machine being adapted to weigh predetermined quantities of material; delivery means within said rim including a stationary, upwardly converging conical table, the base periphery of said conical table being aligned with the bottom edge of said rim to form therewith a convex bottomed receptacle to receive material adjacent the center thereof and deliver the same outwardly toward said rim for delivery through said opening; and means in said machine to removably support a bag to receive said predetermined quantities of material.

2. Packaging apparatus of the class described, comprising in combination: a supporting frame including a cylindrical rim having an opening therethrough, said rim being supported on a journal bearing member for rotation about a vertical axis; power means operatively connected to said frame to rotate the same; a weighing scale secured to the outer periphery of said rim adjacent said opening, said scale having a tilting beam and means on said beam to removably support an open mouthed bag in position to receive material delivered outwardly through said adjacent opening; a gate in said opening, said gate being movable to close said opening and operatively connected to the beam in said scale whereby tilting of said beam occasioned by a predetermined weight of material in said bag closes said gate to block further delivery of material to said bag; a cam member connected to said gate and adapted to move said gate to open position and return said beam to untilted position; a stationary conical table coaxially positioned within said rim and adapted to receive material at the apex thereof for outward radial flow toward said rim whereby to deliver said material through said opening as said rim rotates; and a stationary cam follower mounted on said table and positioned in said circular path to successively engage said cam member as said rim rotates whereby when a filled bag of material is removed from said scale as it passes a station adjacent the periphery of said rim and an empty bag is replaced on said scale, said cam follower will thereafter operate said gate and beam means to reinstitute flow of material into said empty bag.

3. Packaging apparatus comprising: an upstanding pedestal; a conical table fixed to the top of said table; a cylindrical rim member concentrically and rotatably mounted on said pedestal with the lower edge thereof substantially aligned with and closely adjacent to the periphery of said table to form therewith an upwardly convex bottomed receptacle adapted to receive material adjacent the center thereof for gravity actuated delivery outwardly against said rim; at least one opening in said rim to discharge material from said receptacle; an automatic weighing scale supported on said rim outside said opening, said weighing scale having means to support a container adjacent said opening positioned to receive said material discharged therethrough, and gate means responsive to a predetermined weight of material in said container to close said opening; an agitator carried by said rim projecting inwardly therefrom adjacent said opening for movement along the surface of said table adjacent the periphery thereof to direct material in said receptacle through said opening; and resetting means including an actuator carried by said scale movable to reopen said gate means and a stationary cam member carried by said table adjacent the periphery thereof, said cam member being positioned in the path of said actuator to engage the same when said scale is moved past said cam by rotation of said rim.

PAUL L. SNYDER.
CECIL MILLER.

REFERENCES CITED

The following references are of record in the file of this patent:

UNITED STATES PATENTS

| Number | Name | Date |
| --- | --- | --- |
| 315,730 | Clawson | Apr. 14, 1885 |
| 493,796 | Smyser | Mar. 21, 1893 |
| 992,148 | Bates | May 16, 1911 |
| 1,495,724 | Blake | May 27, 1924 |
| 2,280,614 | Ayars | Apr. 21, 1942 |
| 2,373,649 | Broome et al. | Apr. 17, 1945 |